INVENTOR.

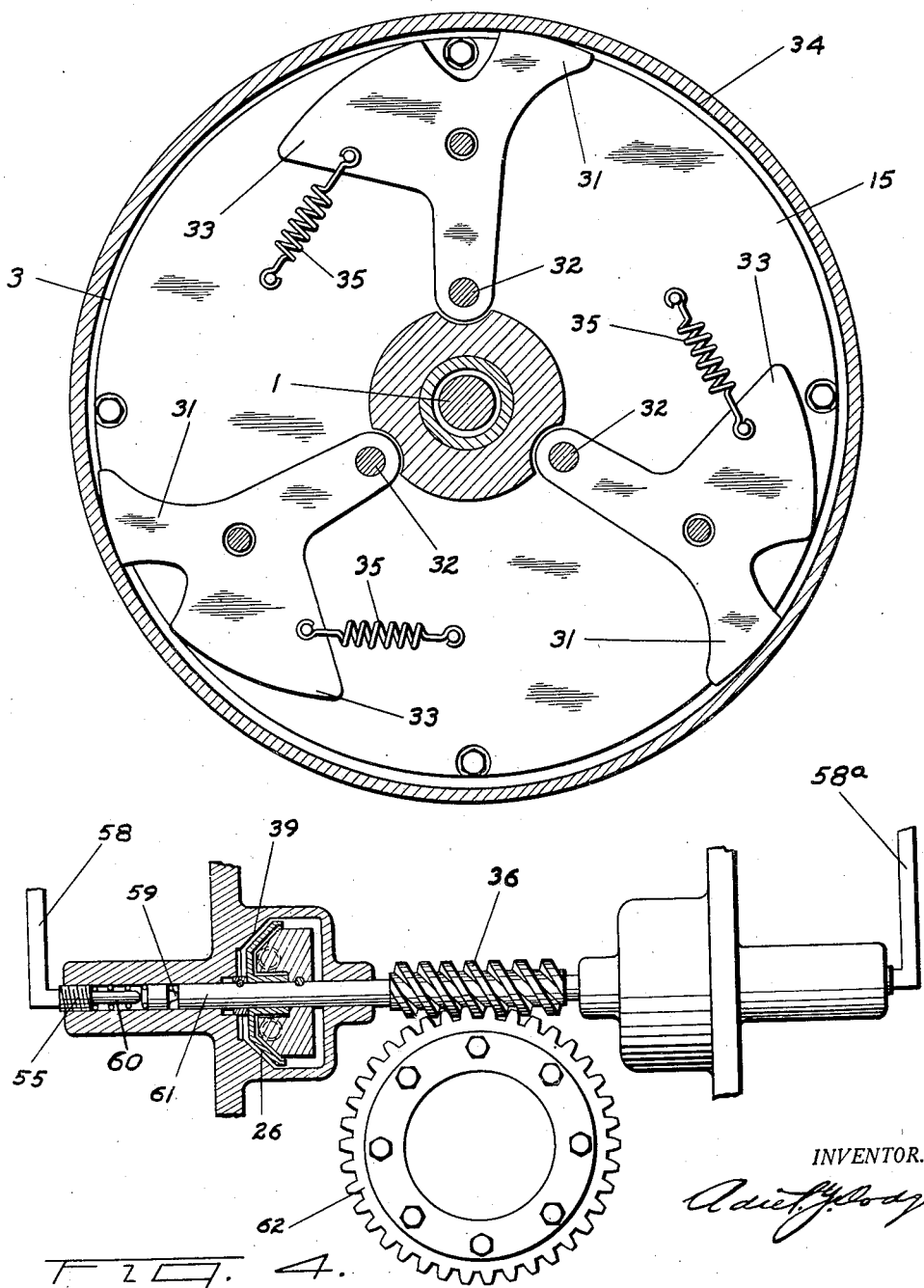

Patented June 25, 1935

2,006,160

UNITED STATES PATENT OFFICE 2,006,160

VARIABLE SPEED TRANSMISSION

Adiel Y. Dodge, South Bend, Ind.

Application February 1, 1933, Serial No. 654,658

22 Claims. (Cl. 74—260)

My invention relates to variable speed transmissions of the mass inertia impulse type.

One of the objects of my invention is to provide a transmission of this type wherein a desirable ratio exists between the centrifugal forces acting about the main axes and the centrifugal forces oscillating about the centers of the planets.

Another object is to coordinate the action of both centrifugal forces and the forces due to oscillating mass.

Another object is to provide means, in a variable speed transmission of this type for motor cars, for eliminating free wheeling at high car speeds and to provide a limited and modified degree of free wheeling at lower car speeds.

A further object is to provide an automatic infinitely variable speed transmission of the mass inertia type suitable for use in automobiles, in particular, which will provide a more nearly desirable balance between input and output torque at the desired speed ratios, and which will operate more smoothly and in more gradual and continuous increments.

A further object is to provide a pick-up mechanism of the mass inertia type, suitable for use with internal combustion engines or electric motors.

A still further object is to utilize the circulation of lubricant as a hydraulic means to assist the function of certain parts in addition to lubricating other parts.

Further objects will appear from the description and claims.

In the drawings in which an embodiment of my invention is shown:

Fig. 4 is a detail sectional view of the one-way clutch shown in Fig. 1; and

Fig. 5 shows an alternative one-way clutch construction as described later.

Figure 1:
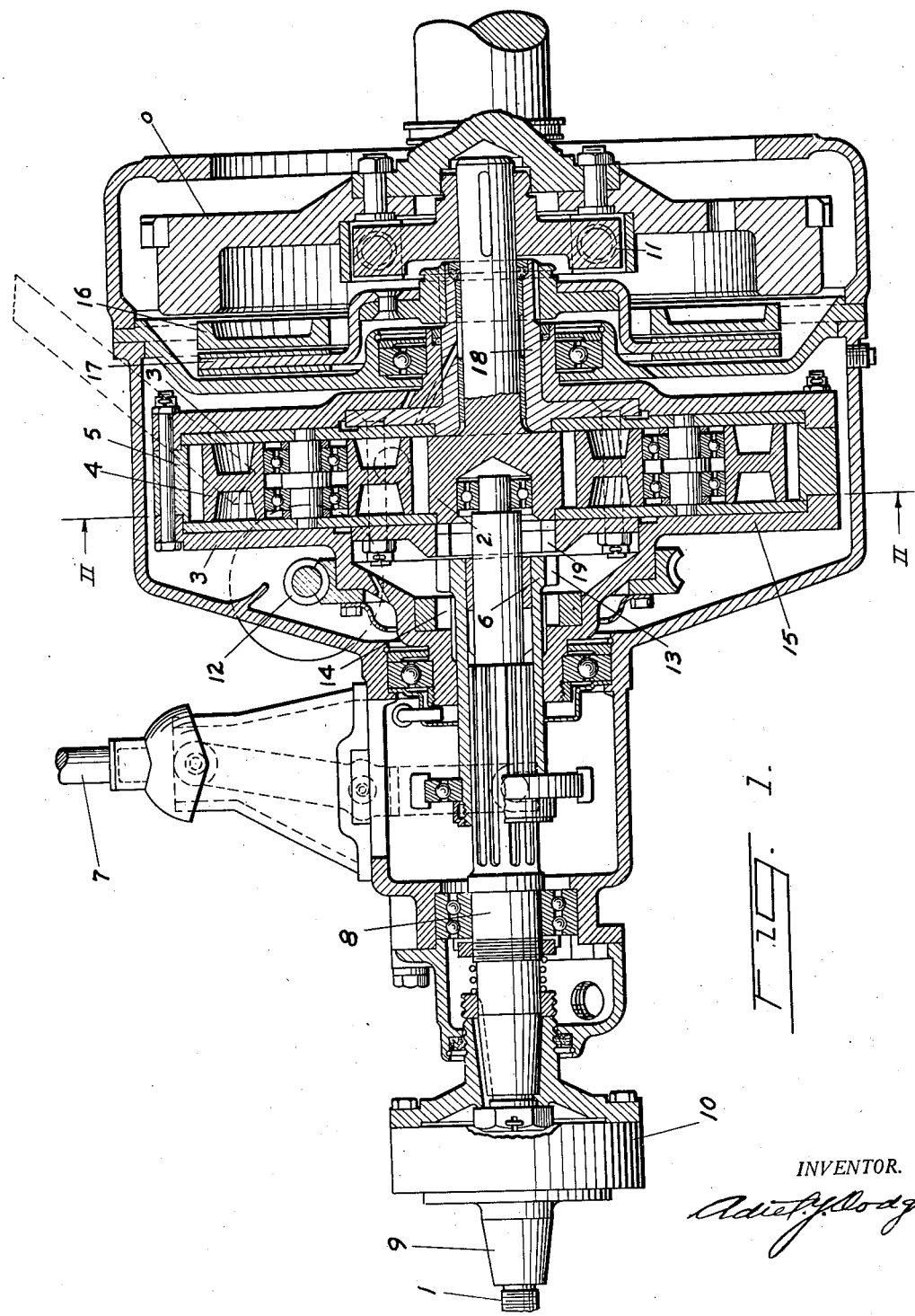
Fig. 1 is an axial section showing my variable speed transmission lying between the fly wheel of an automobile engine and the propeller shaft connection.
Figure 2:
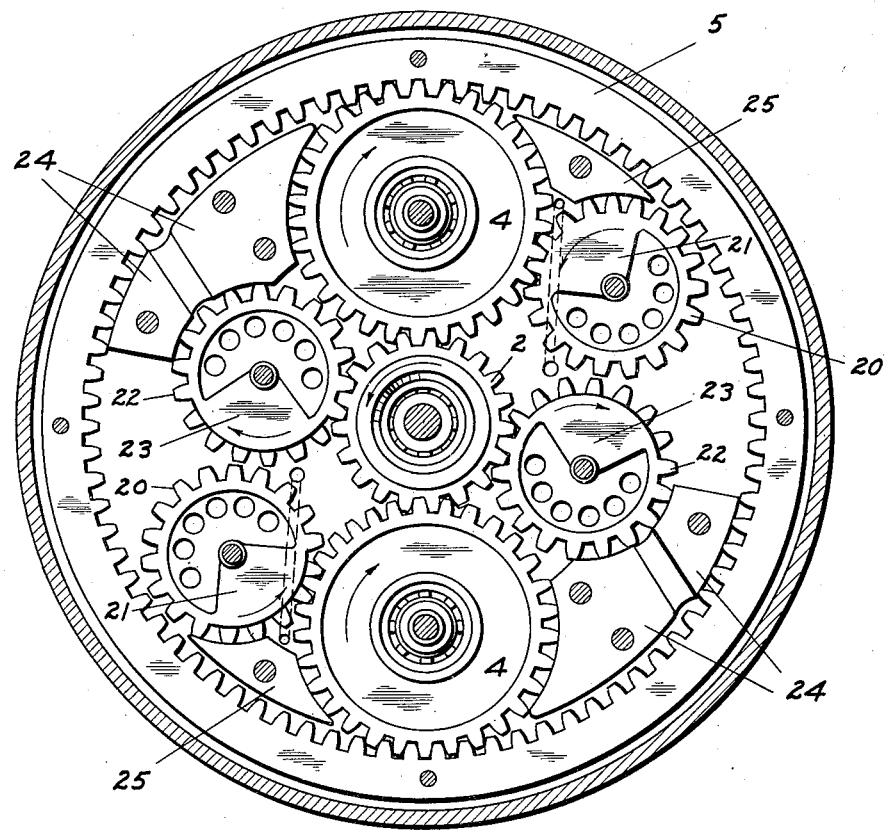
Fig. 2 is a section on line II—II of Fig. 1.

In general, my invention includes, in the embodiment illustrated, a driving sun gear 2, which drives two or more planet gears which, in turn, are in mesh with a ring gear 5. By this means when the ring gear is held stationary a positive low forward gear ratio is produced, provided the planet cage 3 is connected with the driven member 6.

In the illustrated arrangement, there are provided counter weighted auxiliary planet gears 20 meshing with the main planet gears 4, thereby causing counter weights 21 to turn in the same direction as does sun gear 2. The counter weights 21 of the auxiliary planet gears 20 set up forces of two separate and distinct types, which cause the ring gear 5 to tend to turn in the forwardly direction when said forces have reached a sufficiently great magnitude. However, as stated before these counter weights 21 on auxiliary planet gears 20 set up two distinct and different sets of forces; one being the centrifugal force of the counter weights 21 about the main axis 1, and, the other set of forces being caused by counter weights 21 revolving about the centers of the auxiliary planet gears 20.

These forces alternate from positive to negative in relation to the direction of revolution and become greatest when the center of gravity of the counter weight lies at a place where the planet gear radius through it is perpendicular to a center line passing through center 1 and center of the corresponding one of the gears 20. These forces, when positive, tend to turn the entire planet cage in the direction of rotation of the driver. Now, by providing the described novel arrangement of the auxiliary planet gears 20, so that they turn in an opposite direction to the main planet gear 4, this first set of recurring forces is caused to coordinate with and supplement the second mentioned forces in order to accomplish the same results at approximately the same time; namely, advance the ring gear. If it were not for these auxiliary planet gears 20 running in an opposite direction to planets 4 but instead counter weights 40 were placed on the main planet gears 4, these two sets of forces would not coordinate and be complementary but would be opposing.

Where reverse movements are not needed or are secured in other ways the ring gear may be omitted in this arrangement and the one-way clutch shown in Figs. 4 or 5 connected directly to the carrier; the result being a simple impulse transmission, or pick-up mechanism for use with electric motors or internal combustion engines. In the illustrated construction is shown means for causing these two forces to become momentarily complementary and thereby produce a more positive and more desirable action to cause the ring gear 5 to precess at the time when intermediate ratios of speed reduction are desired. As used herein intermediate ratios have reference to those lying between the positive low aforementioned, and the direct speed ratio of 1 to 1 attainable later when the ring gear turns at the same rate of speed as does the sun gear.

In addition to the auxiliary planet gears 20 already mentioned it has been found desirable to introduce a second set of sub-planet gears 22 meshing with the sun gear, but of the same pitch diameter as the first mentioned set of auxiliary planet gears 20. Since these gears are of the same pitch diameter they will turn at the same speed and the counter weights will be synchronized with each other. The sub-planet gears 22 are likewise counter weighted but it will be seen that they turn in a direction opposite to the sun gear and, therefore, opposite to the direction of revolution of the first mentioned set of auxiliary planet gears 20. Also these counter weights on the sub-planet gears 22 set up two sets of distinct forces for the same reasons previously described in connection with the first mentioned auxiliary planet gears 20.

It will also be seen that the force set up about the center of the sub-planet gears 22 alternates, having first a tendency to carry the planet cage 3 in the direction of revolution and alternately in a reverse direction. But, it will be noted that the sub-counter weights 23 are so placed that the tendency to carry the cage in the direction of revolution due to forces about their centers occurs simultaneously with that same tendency present in the counter weights 21 on the first mentioned set of auxiliary planet gears. In this way these sets of forces are complementary and the net result becomes their sum total.

However, the other set of forces, namely, the centrifugal force of each weight about the main axis I, has a tendency to cause the planet cage to revolve in a direction opposite to the direction of revolution. Therefore, this force must be subtracted from the force due to auxiliary counter weights 21 acting about center I to produce a desired combination, hitherto attainable to a lesser degree by counter weights located on the main planet gears. At certain speeds, particularly the higher speeds, the result of centrifugal force about the main axis I becomes very much greater than does the result of centrifugal forces about the centers of gears 20. So at times where a slight gear reduction is desirable, usually at intermediate high speeds, it may be secured. By the arrangement described means for subtracting from the results of centrifugal force about the main axis I and adding to the results of centrifugal forces about planet centers have been shown, thereby producing a transmission which functions at the higher speeds to give the minor reduction ratios and through a larger range of conditions in general.

It will be seen that unlike many other proposed impulse transmissions, the impulses set up in the driven shaft by this transmission fluctuate from a positive minimum low speed to a speed approaching the speed of the driving member; i. e., in this case, the speed of fluctuations delivered to the driven shaft lie between a predetermined minimum low and the speed of the driving member. The driving member possesses a mechanical advantage equivalent to the low speed ratio, with which to overcome the negative impulses, while the positive impulses have a direct action tending to turn the driven shaft at their speed of revolution.

Referring to the drawings in detail, the construction shown comprises the fly wheel 0 of an automobile engine, a driving pinion 2 secured to rotate with the fly wheel, a gear carrier 3 coaxial with the driving pinion 2, planet gears 4 mounted in the gear carrier 3 and meshing with the driving gear 2, a reversible ring gear 5 meshing with the planet gears 4, auxiliary planet gears 20 meshing with the main planet gears 4, and sub-planet gears 22 meshing with the center gear 2. The main planet gears 4, sub-planet gears 22, and auxiliary planet gears 20 are all carried in the gear carrier 3 and have respective centers of revolution within the gear carrier and also revolve bodily about the main axis I as center.

Parts 24 and 25 are provided as spacers between the two plates of the gear carrier 3 to cause the various planet gears to circulate the lubricating oil in which they are running. The lubricating oil has a natural tendency to flow to the outermost part of the casing due to centrifugal force but by means of these spacers so located that the gear teeth entrap small quantities of oil are forced by the gears towards the center, in this way performing two functions: first, to provide adequate lubrication for the parts at the center, and second, to carry the oil from the outermost portion towards the center. By this operation, also, work is done against centrifugal force which has a tendency to cause the ring gear to precess. The circulation of oil is worked out by this means so that its circulation in each instance has a tendency to carry the ring gear in the direction of forward revolution, thus reducing the impact between teeth during the time of fluctuation. However, the restriction of the flow of lubricating oil is sufficient only to form forces tending to turn the ring gear which are auxiliary to the forces due to the masses employed and their arrangement.

The shifting of the driven member 6 to any one of its four positions is controlled by means of a four position lever 7 which may occupy substantially the usual position of the gear shift lever and which can be shifted back and forth to bring the driven member 6 into any one of the four positions specified. This axially shiftable driven member 6 is splined to the forward end of the propeller shaft 8. The rear end of this propeller shaft member 8 may be provided with a member 9 for connection with any suitable rear propeller shaft member.

Reverse

For reverse movement of the propeller shaft with respect to the engine shaft, the change speed lever 7 is shifted to bring the splined driven member 6 to its rearmost position in which the dog clutch teeth 13 on the splined driven member 6 are in engagement with the dog teeth 14 on the side plate 15 of the ring gear 5. By means of suitable operating means (not shown) the nonrotatable plates 16 are caused to grip the rotatable clutch plate 17 thus holding the gear carrier 3 against rotation, since this rotatable clutch member 17 is mounted on the quill or sleeve 18 to which the gear carrier plates 3 are secured. Under these conditions, forward rotation of the driving gear 2 or pinion will cause reverse rotation of the ring gear 5 and hence of the propeller shaft in accordance with the well understood principles of planetary gearing.

Positive low speed forward

By means of the one-way clutch shown in

Figs. 4 or 5 the ring gear 5 may be held against rotation when desired. The clutches may be manually operated by any suitable means, such as those disclosed in my copending application, Serial No. 180,403, filed April 2, 1927. With this construction, therefore, for positive low speed forward, the speed change lever 7 is shifted to bring the clutch teeth 13 of the splined driven member 6 into engagement with the clutch teeth 19 of the gear carrier 3 and suitable control mechanism is operated to cause the clutch 26 in Fig. 4 to hold the ring gear 5 against rotation. With this construction, the gear carrier 3 will be positively driven but at a lower speed of rotation than the driving gear in accordance with the well known laws of precession of planetary gearing.

Figure 3:
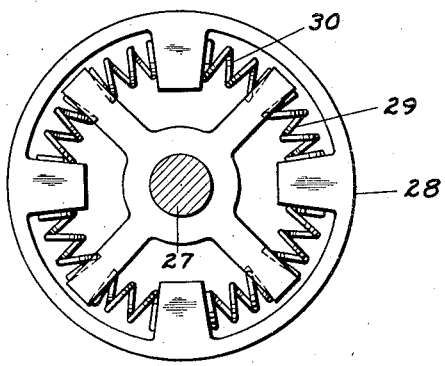
Fig. 3 is a section showing the internal arrangement of the flexible couplings 10 and 11 in Fig. 1.

In Fig. 3 is shown somewhat diagrammatically a suitable type of impulse absorbing coupling having low hysteresis loss, to be arranged as is indicated at 10 and 11 in Fig. 1. It is also proposed to use such a coupling between the clutch member 26 and the shaft member 61 in Fig. 4.

Referring to Fig. 3, shaft 27 is a driving member and shell 28 is a driven member. These parts communicate with each other through suitable springs 29 and 30. Impulses absorbed by these springs are later delivered from the driving part to the driven part; for example, when one-way clutch 12 holds ring gear 5 from turning in a reverse direction at the moment of negative impulse the springs absorb energy which is afterwards delivered to the driven part during the succeeding positive impulse. It is apparent that planet cage 3 will during the negative impulse be turning at a lower rate of speed than it does later in a moment of positive impulse when the ring gear revolves forwardly. Now, it becomes apparent that in order to have the driven shaft 9 turn at a uniform speed a flexible coupling must be employed not merely to absorb vibrations and give a more pleasing performance, but it becomes a necessity in order to allow certain parts, including the planet cage, to fluctuate in speed to make use of the impulses provided.

Fly wheel 8 has a natural tendency to retain a comparatively uniform speed. In order that sun gear 2 may follow up the rapid fluctuations present in the planet gear chain, a flexible coupling 11 is used to communicate between fly wheel 8 and sun gear 2 in order to cause the impulse members to function as intended.

Referring to Fig. 4, in this figure there is shown the detail of construction of the one-way clutch shown at 12 in Fig. 1 and which is more fully explained and described in my copending application, Serial No. 468,786, filed July 18, 1930. Briefly, worm 36 is free to turn in either direction when thrust bearings 59 on both ends of shaft 61 are held in engagement with shaft 61 by means of thrust member 60, but by moving levers 58 and 58a one or the other of these thrust bearings becomes inoperative due to the movement of thread 55 at which time worm 36 becomes free to revolve in one direction only. Forces tending to revolve worm 36 in the opposite direction cause one clutch member 26 to engage its conical seat 39, thus preventing worm 36 from turning, and in turn preventing the rotation of worm wheel 62.

In order that worm 36 may be accelerated at the maximum rate upon the first action of the positive impulse, it is proposed that worm shaft 61 be connected to the conical friction member 26 by means of an impulse absorbing coupling similar to that shown in Fig. 3. It will be apparent that forces in a negative direction will compress spring 29 or 30 as the case may be and that during moments of alternation from the negative to the positive impulses this spring will start the worm 36 revolving in the direction corresponding to positive impulses, thereby securing a more rapid acceleration of the worm 36 so that a minimum loss of time will be had during the intervals of positive impulse. Other means of accelerating the starting of the worm may be supplemented such as a fluid motor attached to the worm shaft. The fluid motor may be provided with fluid pressure by various means including circulating oil pressure from the internal combustion engine which is now allowed to escape, in common practice, through the pressure regulator valve. This construction is contemplated in some installations but not shown herein.

Referring to Fig. 5, as an alternative construction instead of using the one-way device shown at 12 and shown in detail in Fig. 4, the one-way device shown in Fig. 5, may be used. This one-way device shown in Fig. 5 is fully described in my copending application, Serial No. 531,497, filed April 20, 1931. Briefly, this one-way clutch consists of opposed friction shoes 31 pivoted at 32 to cage 3. Counter weights 33 are provided and so located that the centrifugal force about center 1 causes shoes 31 to become disengaged with friction surface 34. Light springs 35 are provided to urge shoes 31 into engagement with friction surface 34 during low speeds. The center of mass of counter weights 33 is so located that negative impulses in cage 3 have a tendency to cause shoes 31 to engage with friction surface 34 and, inversely, positive impulses in cage 3 have a tendency to causes shoes 31 to disengage surface 34.

Having thus described my invention, what I wish to claim as new and novel is set forth in the appended claims:

1. A variable speed transmission comprising mass inertia means arranged to produce positive and negative driving impulses, and including means for yieldingly absorbing the negative impulses and a planetary system embodying a sun member, a ring member concentric with respect to the sun member, planet members engaging both sun member and ring member, and counter weighted planets engaging said first mentioned planet members only.

2. A variable speed transmission comprising mass inertia means arranged to produce positive and negative driving impulses, and including infinite-ratchet means to absorb the negative impulses and a planetary system embodying a sun member, a ring member concentric with respect to the sun member, planet members engaging both sun member and ring member, counter weighted planets engaging said first mentioned planet members only, the counter weights of said planets being arranged so that the positive driving impulses due to centrifugal force about the main center and those about the planet centers act substantially simultaneously to advance the ring member.

3. A variable speed transmission comprising mass inertia means to produce positive and negative driving impulses, and including a planetary system embodying a sun gear, a ring gear concentric with respect to the sun gear, planet gears engaging both a sungear and ring gear, counter weighted planets engaging said first mentioned planet gears only, and means for absorbing said negative impulses of the counter weighted planets and allowing only the positive impulses to drive.

4. A variable speed transmission comprising mass inertia means to produce positive and negative driving impulses, and including a planetary system embodying a sun gear, a ring gear concentric with respect to the sun gear, planet gears engaging both sun gear and ring gear, counter weighted planets engaging said first mentioned planet gears only, the counter weights of the planets being arranged so that the positive driving impulses due to centrifugal force about the main center and those about the planet center act substantially simultaneously to advance the ring gear, and reactance means to arrest the negative impulses of the counter weights.

5. A variable speed transmission comprising a sun gear, a set of planet gears meshing therewith, a second set of planet gears, counter weighted and meshing only with said first planet gears, to produce mass inertia impulses tending to revolve the planet assembly about its main center positively and negatively, means to allow positive rotation on each positive impulse and to prevent negative rotation of the planet assembly on each negative impulse.

6. A variable speed mass inertia transmission comprising an epicyclic gear set including a sun gear, planet gears having a planet gear carrier pivoted at the center of the sun gear, said planet gears meshing with said sun gear, counter weighted planet gears meshing with said first planet gears only, and a one-way reactance device having springs for yieldingly absorbing the negative impulses of the counter weighted gears and adding the force thereof to the positive impulses.

7. A variable speed mass inertia transmission comprising an epicyclic gear set including a sun gear, planet gears having a planet gear carrier pivoted at the center of the sun gear, said planet gears meshing with said sun gear, counter weighted planet gears meshing with said first planet gears, and reactance means acting as an infinite ratchet to arrest the negative impulses of said counter weighted gears.

8. A variable speed transmission comprising a sun gear, a set of planet gears meshing therewith, a second set of planet gears, counter weighted and meshing only with said first planet gears, a set of counter weighted sub-planet gears turning opposite to the sun gear and at the same rate as the first set of counter weighted planets to produce mass inertia impulses tending to revolve the planet assembly about its main center positively and negatively, and means to allow positive rotation on each positive impulse and to prevent negative rotation of the planet assembly on each negative impulse.

9. A variable speed transmission comprising mass inertia means to produce positive and negative driving impulses, and including a planetary system embodying a sun member, a ring member concentric with respect to the sun member, planet members engaging both sun member and ring member, counter weighted planets engaging said first mentioned planet members only, a set of counter weighted sub-planet gears turning opposite to the sun gear and at the same rate as the first set of counter weighted planets, and a reactance device to absorb the negative impulses of both sets of counter weighted planets.

10. A variable speed transmission comprising mass inertia means to produce positive and negative driving impulses, and including a planetary system embodying a sun member and a ring member concentric to each other, planet members engaging both sun member and ring member, and two sets of counter weighted planet members turning at synchronous speed in opposite directions to each other.

11. A variable speed mass inertia transmission comprising a sun gear and counter weighted planetary gears arranged to revolve about their own axes in the same direction of revolution as does said sun gear and having reactance means absorbing the negative driving impulses of said planetary gears.

12. A variable speed transmission comprising a sun gear, a set of planet gears meshing therewith, a ring gear, a second set of planet gears, counter weighted and meshing only with said first planet gears, to produce mass inertia impulses tending to revolve the planet assembly about its main center positively and negatively, and means to allow positive rotation on each positive impulse and to prevent negative rotation of the planet assembly on each negative impulse.

13. A variable speed mass inertia transmission comprising a sun gear, counter weighted planetary gears arranged to revolve about their own axes in the same direction of revolution as does said sun gear, and hydraulic means including said planetary gears to aid the precession of the ring gear and simultaneously circulate lubricant.

14. A variable speed mass inertia transmission comprising a sun gear, counter weighted planetary gears arranged to revolve about their own axes in the same direction of revolution as does said sun gear, and hydraulic means including said planetary gears to aid the precession of the ring gear, reduce back-lash and circulate lubricant.

15. A variable speed transmission comprising mass inertia means to produce positive and negative driving impulses, and including a planetary system embodying a sun member and a ring member concentric to each other, planet members engaging both sun member and ring member, counter weighted planets engaging said first mentioned planet members only, the counter weights being arranged so that the positive driving impulses due to centrifugal force about the main center and those about the planet center act substantially simultaneously to advance the ring member, one-way reactance means to arrest the negative impulses, said reactance means being arranged to accelerate the action of the one-way reactance member at the beginning of each positive impulse.

16. A variable speed transmission comprising a sun gear, a set of planet gears meshing therewith, a second set of planet gears, counter weighted and meshing only with the first planet gears and arranged to produce mass inertia impulses tending to revolve the planet assembly about its main center positively and negatively, means to allow positive rotation, means to prevent negative rotation of the planet assembly, and means to accelerate the action of the one-way reactance member at the beginning of each positive impulse.

17. A variable speed mass inertia transmission comprising an epicyclic gear set, including a sun gear, planet gears, a planet gear carrier pivoted at the center of the sun gear, said planet gears meshing with the sun gear, counter weighted planet gears meshing with said first planet gears, one-way reactance means to arrest the negative impulses of the counter weighted gears, and means to accelerate the action of the one-way reactance member at the beginning of each positive impulse.

18. A variable speed transmission comprising mass inertia means to produce positive and negative driving impulses, and including a planetary system embodying a sun gear and a ring gear concentric to each other, planet gears engaging both sun gear and ring gear, counter weighted planets engaging said first mentioned planet gears only, and means for momentarily storing part of the energy due to negative impulses and deliver said energy at the times of positive impulses.

19. A variable speed transmission comprising mass inertia means to produce positive and negative impulses, and including a planetary system embodying a sun gear and a ring gear concentric to each other, planet gears engaging both sun gear and ring gear, counter weighted planets engaging said first mentioned planet gears only, the counter weights being arranged so that the positive driving impulses due to centrifugal force about the main center and those about the planet center act substantially simultaneously to advance the ring gear, reactance means to arrest the negative impulses, and means for momentarily storing part of the energy due to the negative impulses and deliver said energy during the times of positive impulses.

20. A variable speed mass inertia transmission comprising an epicyclic gear set, including a sun gear, planet gears, a planet gear carrier pivoted at the center of the sun gear, said planet gears meshing with the sun gear, counter weighted planet gears meshing with said first planet gears, a set of counter weighted sub-planet gears turning opposite to the sun gear and at the same rate as the first set of counter weighted planets, and means for absorbing the negative impulses of both sets of counter weighted gears.

21. In a variable speed transmission, a planetary gear set combining a mass inertia impulse transmission comprising planet gears and counter weighted planet gears meshing therewith to turn in the opposite direction, means to arrest the negative impulses of the counter weighted gears, a ring gear, means to hold the ring gear fixed to effect a positive low speed, a planet carrier for said planet gears, and means to hold the planet carrier fixed to effect a positive low speed reverse.

22. In a variable speed transmission a planetary gear set combining a mass inertia impulse transmission comprising planet gears and counter weighted planet gears meshing therewith to turn in the opposite direction, means to arrest the negative impulses of the counter weighted gears, a ring gear, means to hold the ring gear fixed to effect a positive low speed, a planet carrier for said planet gears, means to hold the planet carrier fixed to effect a positive low speed reverse, a driven member, and means to selectively connect the driven member with either the ring gear or the planet carrier to transmit a low speed reverse or speeds forward, as desired.

ADIEL Y. DODGE.